(No Model.) 2 Sheets—Sheet 1.
C. C. JEWETT.
HAY LOADER.
No. 461,340. Patented Oct. 13, 1891.
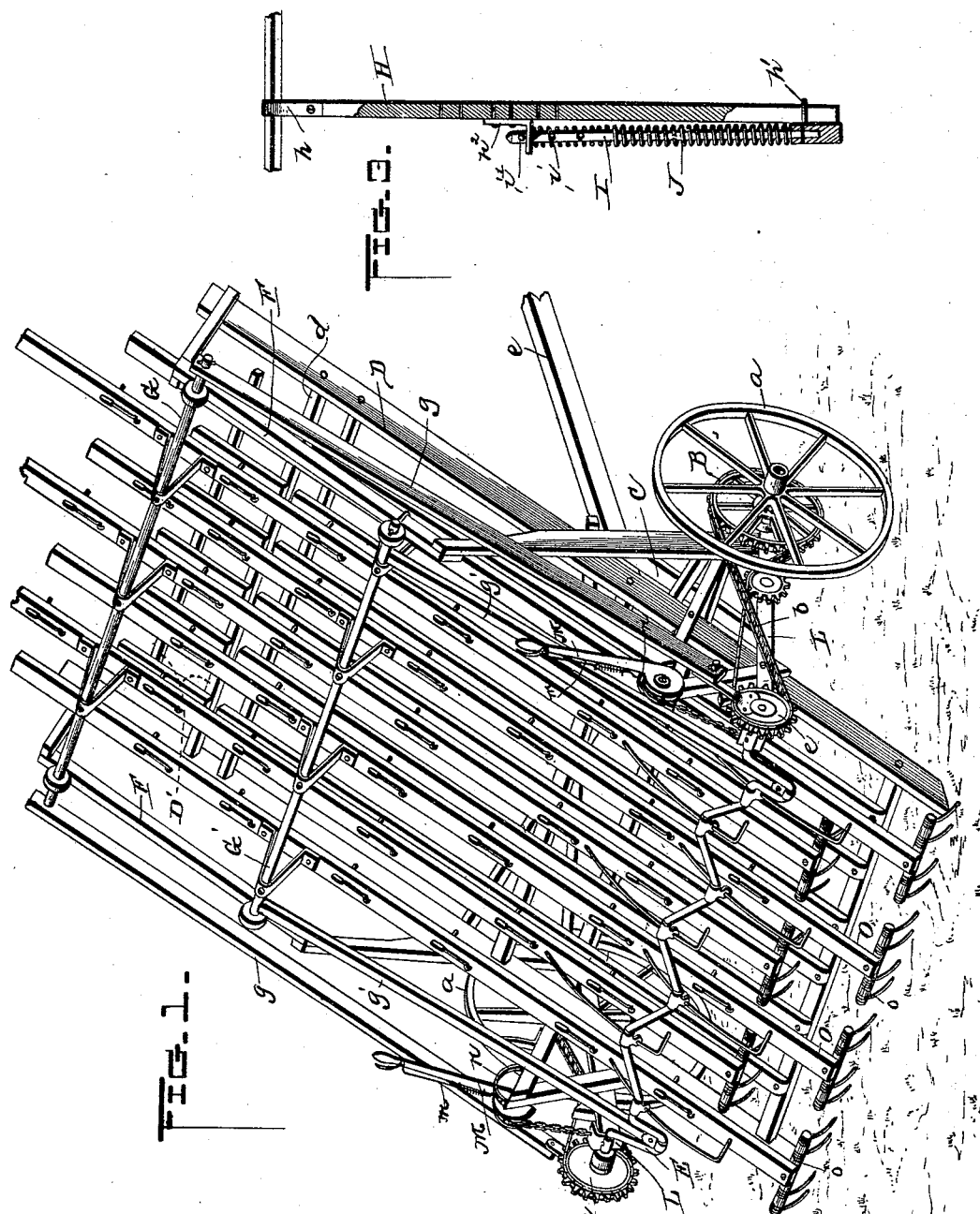
WITNESSES
F. L. Ourand
Van Buren Hillyard
INVENTOR
Charles C. Jewett
By R. S. & A. P. Lacey
his Attorneys

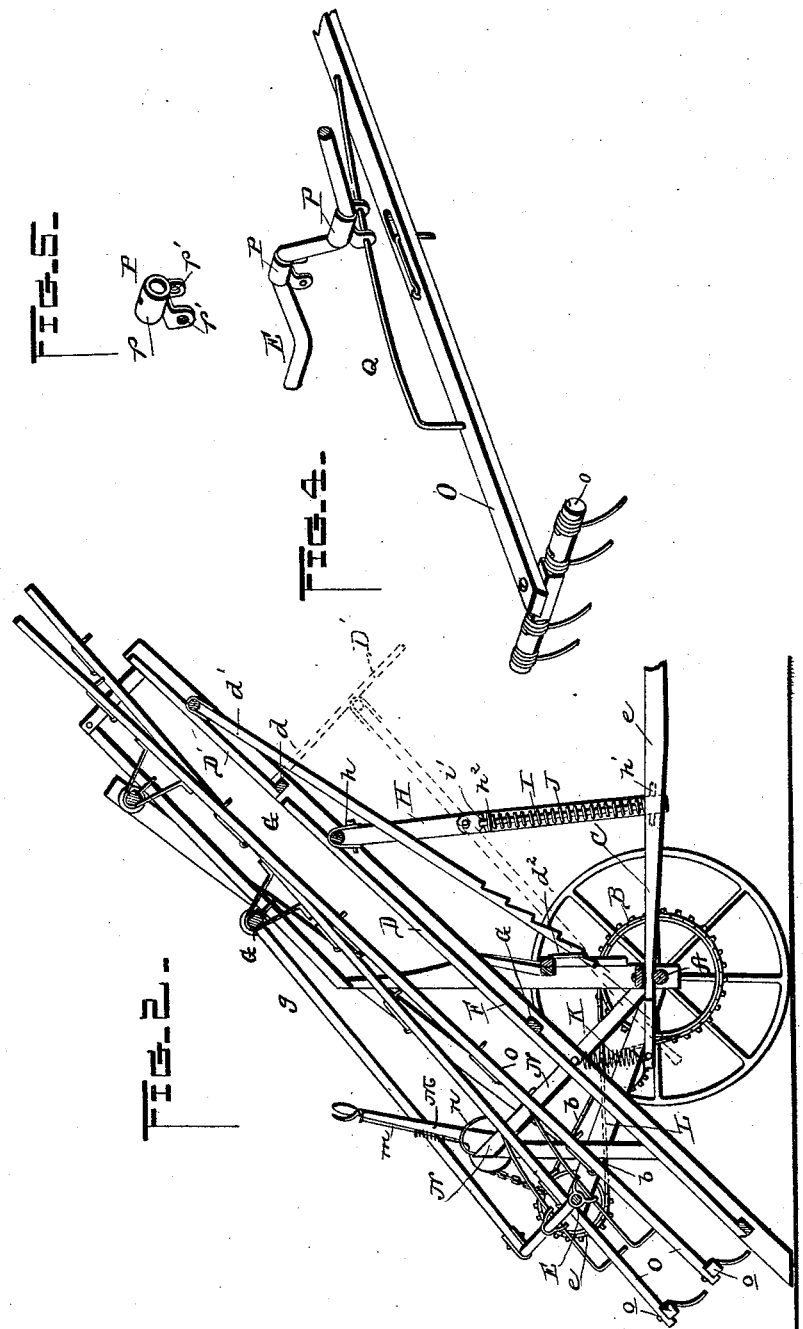

UNITED STATES PATENT OFFICE.

CHARLES C. JEWETT, OF SAND SPRING, IOWA.

HAY-LOADER.

SPECIFICATION forming part of Letters Patent No. 461,340, dated October 13, 1891.

Application filed October 9, 1890. Serial No. 367,560. (No model.)

*To all whom it may concern:*

Be it known that I, CHARLES C. JEWETT, a citizen of the United States, residing at Sand Spring, in the county of Delaware and State of Iowa, have invented certain new and useful Improvements in Hay-Loaders; and I do hereby declare the following to be a full, clear, and exact description of the invention, such as will enable others skilled the art to which it appertains to make and use the same.

This invention relates to hay-loaders and aims to improve the general construction of the same, whereby, first, the reciprocating rakes can be readily adjusted to and from the ground; second, hangers between the crank-shaft and the rakes are dispensed with and replaced by a coupling and a guide-bar; third, the spring between the draft-frame and the inclined table is protected by a stout bar and can be quickly adjusted to change the relative positions of the said table and draft-frame and is capable of having its tension regulated at a moment's notice; fourth, the upper portion of the said table is adjusted to deliver the hay on the wagon without the necessity of elevating it too high at first, thereby preventing the hay being blown off in a head wind and lessening the work of the animals, and, lastly, to provide simple and efficient means for accomplishing these several objects in an economical and convenient manner.

The improvements consist of the novel features and the peculiar construction and combination of the parts, which will be hereinafter more fully described and claimed, and which are shown in the annexed drawings, in which—

Figure 1 is a perspective view of a hay-loader embodying my invention. Fig. 2 is a vertical central section of the machine, showing the adjustment of the upper portion of the table and the adjustment of the casting which connects the spring with the fender-bar between the table and the draft-frame by dotted lines. Fig. 3 is a front view of the fender-bar and the spring, showing the adjustment of the same by dotted lines. Fig. 4 is a detail view of the lower end of one of the rake-bars, showing the crank-shaft, the coupling, and the guide-rod. Fig. 5 is a perspective detail view of one of the couplings detached.

The axle A, having the drive-wheels $a$ $a$ and the sprocket-wheels B B, the draft-frame C, loosely mounted on the axle A and having the pole or tongue $e$, the inclined table D, over which the hay is carried by the rakes, the rake-bars O, the crank-shaft E, operated from the sprocket-wheels B B by the sprocket-chains $b$ $b$, which pass over sprocket-pinions $e$ $e$ on the ends of the crank-shaft E, the guide-rails F, the cross-bars G and G', having connection with the respective rake-bars, and the pitmen $g$ and $g'$, connecting the cross-bars with the crank-shaft, whereby a reciprocating motion is imparted to the said rake-bars, are of old and well-known construction, arrangements, and operation and are shown to illustrate the application of the present invention.

The fender-bar H, interposed between the table D and the draft-frame, is pivotally connected at its upper end with the table by a clip $h$, which embraces a cross-bar of the table and is secured to the said fender-bar H, and its lower end passes through keeper $h'$ on the draft-frame and is adapted to work loosely therein. The casting $h^2$ is adapted to be adjustably connected with the bar H, and is apertured to receive the upper end of the rod I, which rod is pivotally connected with the draft-frame at its lower end. The spring J, mounted on rod I, has its points of resistance on the draft-frame and the casting $h^2$ and is adapted to sustain the weight of the load. The rod I is provided near its upper end with a series of openings $i$, through any one of which the key or pin $i'$ is adapted to be passed. By projecting the upper end of the rod I more or less through the casting $h^2$ the tension on the spring J can be varied at pleasure. (See Fig. 3.) The springs K K connect the draft-frame and the table in the rear of the axle and serve to hold the rear or lower end of the table in contact with and cause it to trail on the ground. The upper portion D' of the table is hinged at its lower end in any convenient manner, so that it can be turned down, as shown by dotted lines in Fig. 2, preferably by having the ends of the cross-bar $d$ journaled in the side bars of the table. The adjustable portion D' is held at the located position by any suitable contrivance, as by the bar $d'$, which is connected at its upper end with the adjustable portion $D'$ and has its lower end passed through a stirrup and notched to engage with the stirrup.

The crank-shaft E is journaled at its ends to the arms L, which are mounted at their inner ends on the axle A, the outer ends of the arms being raised or lowered by the segment-levers M, which are pivoted on the standards N. These levers M are held in the required position by latch-bolts $m$ and notched segments $n$, which are secured to the standards N. By operating levers M M the free ends of arms L L can be elevated or depressed, thereby bringing the rake-heads $o$ on the rake-bars nearer to or farther from the ground.

The couplings P, which connect the rake-bars $o$ with the crank-shaft, comprise a sleeve or bearing $p$ and arms $p'$, through which the guide-rods Q pass. These guide-rods Q are secured at their ends to the rake-bars and incline from the rake-bars from front to rear sufficiently far to permit the rake-heads to travel on the ground.

The operation of the machine is similar to prior like machines, except that the hay is not lifted to the full height of the table during the first stages of loading the wagon to which the machine is attached, in that the upper portion of the said table is turned down out of the way. After the wagon is loaded to the height of the turned down end of the adjustable portion of the table, the latter is turned up a portion of the way or in line with the main part of the table, as shown by full lines in Fig. 1.

The fender-bar H protects the spring J from injury and prevents the wagon to which the hay-loader is attached being run upon and doing injury to the said loader, the blow being received and taken up by the said bar H, which is made sufficiently stout for the purpose.

Having thus described my invention, what I claim, and desire to secure by Letters Patent, is—

1. In a hay-loader, the combination, with the grain-elevating devices and mechanism for actuating the same, of a separate and independent grain-table located wholly beneath the said grain-elevating devices and composed of a fixed portion D and a movable portion $D'$, which movable portion is pivoted at its lower end in close proximity to the upper end of the fixed portion D and is free to be turned down and away from the said grain-elevating devices to diminish the load thereon, and means for supporting the movable portion of the grain-table at the desired location, substantially as described.

2. In a hay-loader, the combination, with the axle, the draft-frame, and the grain-table having the elevating devices, of the fender-bar connected at its upper end with the grain-table and having its lower end passing through a keeper on the draft-frame, a casting on the side of the fender-bar, means for adjustably connecting the casting with the fender-bar, a rod connected at its lower end with the draft-frame and having its upper end working through the said casting and provided with a series of openings, a spring mounted on the said rod and held between the casting and the draft-frame, and a pin to pass through one of the series of openings in the said rod, substantially as and for the purpose described.

3. In a hay-loader, the combination, with the table, the elevating-rakes, and the crank-shaft, of guide-rods secured to the rakes, and the couplings mounted on the crank-shaft and receiving and traveling upon the said guide-bars, substantially as set forth.

4. In a hay-loader, the combination, with the table, the elevating-rakes, and the crank-shaft, of the guide-rods connected at their ends with the said rakes and inclining away from the said rakes from front to rear, and the couplings mounted on the said crank-shaft and adapted to travel on and have connection with the said guide-rods, substantially as and for the purpose specified.

In testimony whereof I affix my signature in presence of two witnesses.

CHARLES C. JEWETT.

Witnesses:
J. M. HASSENPFLUG,
R. J. GUTHRIE.